(12) United States Patent
Wang et al.

(10) Patent No.: US 11,782,209 B2
(45) Date of Patent: Oct. 10, 2023

(54) OPTICAL CROSS APPARATUS

(71) Applicant: Huawei Technologies Co., Ltd., Shenzhen (CN)

(72) Inventors: Qian Wang, Shenzhen (CN); Yongping Liao, Dongguan (CN); Jie Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/587,091

(22) Filed: Jan. 28, 2022

(65) Prior Publication Data

US 2022/0155528 A1 May 19, 2022

Related U.S. Application Data

(63) Continuation of application No. PCT/CN2020/106191, filed on Jul. 31, 2020.

(30) Foreign Application Priority Data

Jul. 31, 2019 (CN) .................. 201910702129.X

(51) Int. Cl.
*G02B 6/12* (2006.01)
*G02B 6/125* (2006.01)
*G02B 6/293* (2006.01)
*G02B 6/35* (2006.01)

(52) U.S. Cl.
CPC ......... *G02B 6/125* (2013.01); *G02B 6/12002* (2013.01); *G02B 6/12004* (2013.01); *G02B 6/293* (2013.01); *G02B 6/29386* (2013.01); *G02B 6/3504* (2013.01); *G02B 6/3556* (2013.01)

(58) Field of Classification Search
CPC ............ G02B 6/12002; G02B 6/12004; G02B 6/125; G02B 6/293; G02B 6/29386; G02B 6/3504; G02B 6/3556
See application file for complete search history.

(56) References Cited

U.S. PATENT DOCUMENTS

| | | | |
|---|---|---|---|
| 7,597,483 B2 | 10/2009 | Simmons et al. | |
| 9,124,959 B2* | 9/2015 | Xu | ...................... H04L 49/1515 |
| 9,188,831 B2 | 11/2015 | Neilson et al. | |
| 9,435,971 B2 | 9/2016 | Wang et al. | |
| 10,234,644 B1* | 3/2019 | Butler | ................ G02B 6/02395 |
| 10,564,441 B2* | 2/2020 | Psaila | ..................... G02B 27/42 |

(Continued)

FOREIGN PATENT DOCUMENTS

| CN | 1377470 A | 10/2002 |
|---|---|---|
| CN | 1541343 A | 10/2004 |

(Continued)

*Primary Examiner* — Ryan A Lepisto
(74) *Attorney, Agent, or Firm* — Paul Christopher Hashim

(57) ABSTRACT

An optical cross apparatus including a single-row fiber array, and a single-row input multidimensional output optical waveguide element, where the single-row fiber array is coupled to the single-row input multidimensional output optical waveguide element, and an arbitrarily curved spatial three-dimensional waveguide is generated inside the single-row input multidimensional output optical waveguide element, and where a coupling surface of the single-row fiber array is the same as that of the single-row input multidimensional output optical waveguide element.

14 Claims, 6 Drawing Sheets

(56) References Cited

U.S. PATENT DOCUMENTS

| | | | |
|---|---|---|---|
| 10,684,419 B2 * | 6/2020 | Fortusini | G02B 6/13 |
| 10,809,455 B2 * | 10/2020 | Triplett | G02B 6/125 |
| 10,955,622 B2 | 3/2021 | Matsui et al. | |
| 11,099,341 B1 * | 8/2021 | Bradley | G02B 6/43 |
| 11,256,042 B2 * | 2/2022 | Evans | G02B 6/403 |
| 11,493,760 B2 * | 11/2022 | Grief | G02B 27/0994 |
| 2005/0180689 A1 | 8/2005 | Kozhevnikov et al. | |
| 2008/0031627 A1 | 2/2008 | Smith et al. | |
| 2010/0178007 A1 | 7/2010 | Thomson et al. | |
| 2015/0085884 A1 * | 3/2015 | Fontaine | H04B 10/2581 |
| | | | 370/542 |
| 2016/0327749 A1 | 11/2016 | Jiang | |
| 2019/0170945 A1 * | 6/2019 | Fortusini | G02B 6/13 |

FOREIGN PATENT DOCUMENTS

| | | |
|---|---|---|
| CN | 101571603 A | 11/2009 |
| CN | 102116898 A | 7/2011 |
| CN | 103454735 A | 12/2013 |
| CN | 104169792 A | 11/2014 |
| CN | 106501883 A | 3/2017 |
| CN | 107305270 A | 10/2017 |
| CN | 109738988 A | 5/2019 |
| JP | 2008040447 A | 2/2008 |
| JP | 2014178628 A | 9/2014 |
| WO | 2016181778 A1 | 11/2016 |
| WO | 2019131441 A1 | 7/2019 |

* cited by examiner

OPTICAL CROSS APPARATUS

CROSS-REFERENCE TO RELATED APPLICATIONS

This application is a continuation of International Application No. PCT/CN2020/106191, filed on Jul. 31, 2020, which claims priority to Chinese Patent Application No. 201910702129.X, filed on Jul. 31, 2019. The disclosures of the aforementioned applications are hereby incorporated by reference in their entireties.

TECHNICAL FIELD

This application relates to the field of optical communication, and in particular, to an optical cross apparatus.

BACKGROUND

With the rapid development of optical fiber communication technologies, an optical fiber that can previously transmit only one wavelength can now transmit 40 or even more wavelengths, and a transmission speed of each wavelength is greatly increased. In a dense wavelength division multiplexing technology, a plurality of wavelengths are gathered together to be amplified and transmitted as a whole in one optical fiber. In this way, a transmission capacity is greatly increased without upgrading an existing optical fiber transmission device. A future all-optical network may be based on the dense wavelength division multiplexing technology. An optical cross system is a core device in the dense wavelength division multiplexing all-optical network, and can avoid an electronic bottleneck caused by optical-to-electrical and electrical-to optical conversion on each node in a high-speed electrical transmission network, thereby implementing highly-reliable, large-capacity, and highly-flexible transmission. The optical cross system implements switching between different optical ports by using a built-in optical switching engine. To implement such switching between optical ports, for an optical cross apparatus, at present, an optical port is usually generated by using a method shown in FIG. 1 or FIG. 2.

In the optical cross apparatus shown in FIG. 1, two one-dimensional fiber arrays are bonded together side by side, to form one two-dimensional light outlet port. In the optical cross apparatus shown in FIG. 2, each optical path of the optical cross apparatus is generated by punching holes on a silicon material or a glass material, and an optical fiber passes through these through holes to form two-dimensional light outlet ports.

Consequently, an optical cross solution of the optical cross apparatus is fixed and processing costs are relatively high.

SUMMARY

Embodiments of this application provide an optical cross apparatus, for providing a plurality of optical cross solutions, reducing process costs, and eliminating coupling loss.

According to a first aspect, an embodiment of this application provides an optical cross apparatus. The optical cross apparatus includes a single-row fiber array and a single-row input multidimensional output optical waveguide element, where the single-row fiber array is coupled to the single-row input multidimensional output optical waveguide element, and an arbitrarily curved spatial three-dimensional waveguide is generated inside the single-row input multidimensional output optical waveguide element; and a coupling surface of the single-row fiber array is the same as that of the single-row input multidimensional output optical waveguide element.

It may be understood that, on the coupling surface of the single-row fiber array and the coupling surface of the single-row input multidimensional output optical waveguide element, a quantity of light outlets included in the single-row fiber array is the same as a quantity of light inlets included in the single-row input multidimensional output optical waveguide element, and after coupling, positions are also in one-to-one correspondence, to smoothly transmit optical signals.

In the optical cross apparatus provided in this embodiment, the arbitrarily curved spatial three-dimensional waveguide exists inside the single-row input multidimensional output optical waveguide element. As a result, light outlets of the optical waveguide element can be arbitrarily combined, so that the optical cross apparatus can implement a plurality of optical cross solutions. In addition, the spatial three-dimensional waveguide inside the optical waveguide element can be arbitrarily designed and molded through one-step forming, to reduce processing costs of the optical cross apparatus.

Optionally, a surface of each light outlet of the single-row input multidimensional output optical waveguide element is processed in a femtosecond laser processing manner to generate a microlens, and the microlens is configured to perform beam shaping on beams output from the light outlet. In this embodiment, the surface of the light outlet of the optical waveguide element is processed through one-step forming in the femtosecond laser processing manner, to generate the microlens, so that no gap is left between the microlens and the light outlet of the optical waveguide element, and no coupling loss is introduced anymore.

Optionally, the spatial three-dimensional waveguide inside the single-row input multidimensional output optical waveguide element is generated in a femtosecond laser processing manner. In this embodiment, when the spatial three-dimensional waveguide inside the optical waveguide element uses the femtosecond laser processing manner, processing of the optical waveguide element can be facilitated, so that a processing method is easier, and processing costs are reduced. In addition, after femtosecond laser processing is performed, a distance between light outlets after processing can reach a micron level, to implement high-density light emitting, and provide solutions for a high-density and multi-port optical cross system. In addition, a path position of the spatial waveguide in the optical waveguide element can achieve precision of a submicron level, to greatly improve debugging efficiency of the optical cross apparatus.

Optionally, a combination form of light outlets of the single-row input multidimensional output optical waveguide element includes but is not limited to two or more rows, non-uniform distribution, tilting distribution, or high-density arrangement. In this embodiment, a plurality of combination manners are generated for the light outlets of the single-row input multidimensional output optical waveguide element, so that the optical cross apparatus can implement a plurality of optical cross solutions.

According to a second aspect, based on the optical cross apparatus in the first aspect, a transmission path of optical signals in the optical cross apparatus is as follows: Optical signals enter from single-row light inlets of the single-row fiber array, and are output from single-row light outlets of the single-row fiber array to single-row input ports of the single-row input multidimensional output optical waveguide element; and the optical signals are transmitted from optical paths of the spatial three-dimensional waveguide inside the single-row input multidimensional output optical waveguide element to light outlets of the single-row input multidimensional output optical waveguide.

DETAILED DESCRIPTION OF ILLUSTRATIVE EMBODIMENTS

Embodiments of this application provide an optical cross apparatus, for providing a plurality of optical cross solutions, reducing process costs, and eliminating coupling loss.

In the specification, claims, and accompanying drawings of this application, the terms "first", "second", and so on (if existent) are intended to distinguish between similar objects, but do not necessarily indicate a specific order or sequence. It should be understood that the data termed in such a way are interchangeable in appropriate circumstances, so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other steps or units not expressly listed or inherent to such a process, method, product, or device.

With the rapid development of optical fiber communication technologies, an optical fiber that can previously transmit only one wavelength can now transmit 40 or even more wavelengths, and a transmission speed of each wavelength is greatly increased. In a dense wavelength division multiplexing technology, a plurality of wavelengths are gathered together to be amplified and transmitted as a whole in one optical fiber. In this way, a transmission capacity is greatly increased without upgrading an existing optical fiber transmission device. A future all-optical network may be based on the dense wavelength division multiplexing technology.

Figure 1:
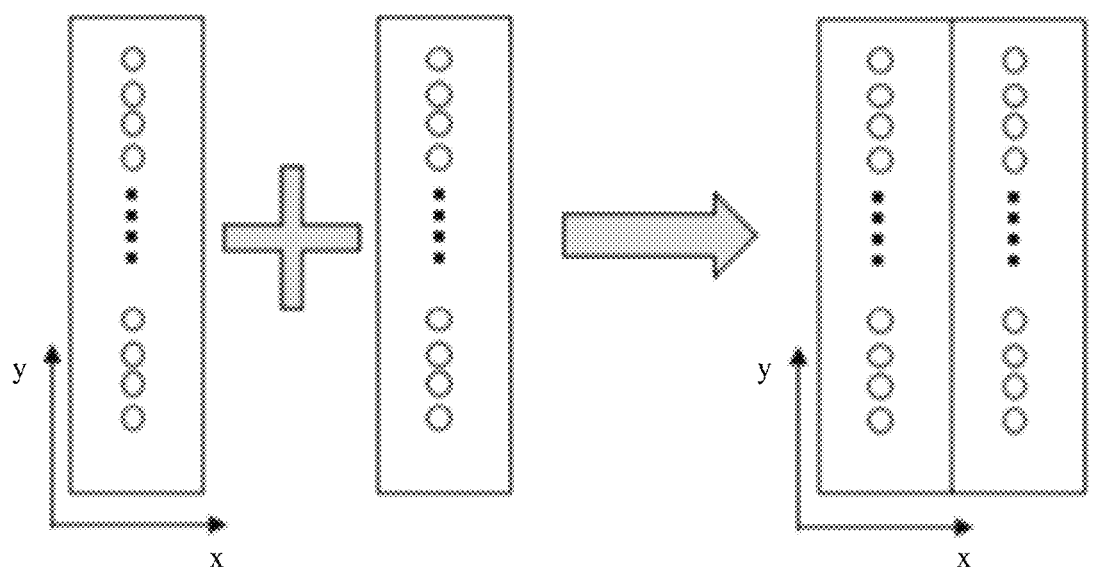
FIG. 1 is a schematic diagram of an optical cross apparatus.
Figure 2:
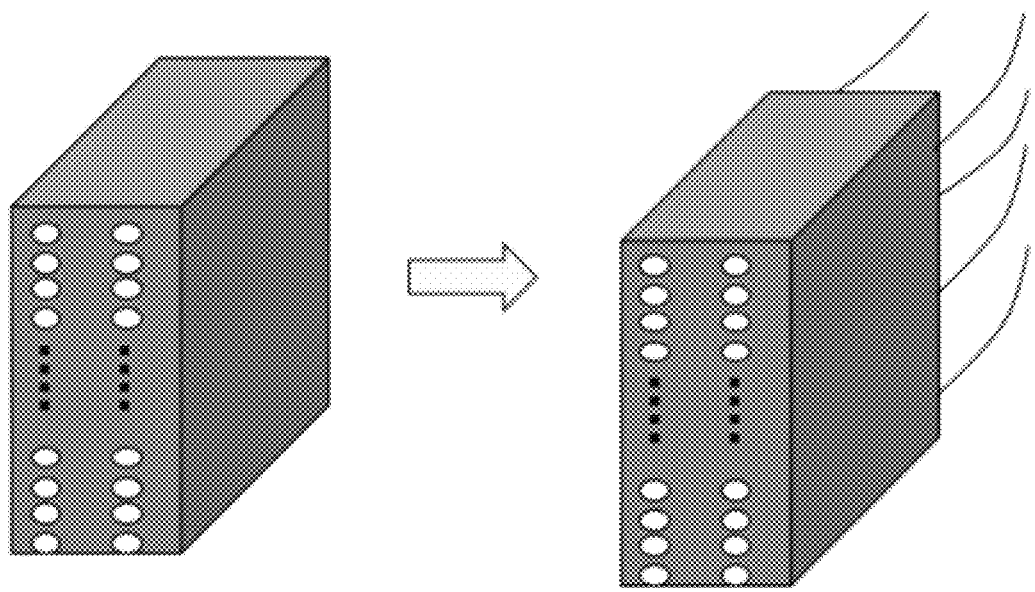
FIG. 2 is a schematic diagram of another optical cross apparatus.
Figure 3:
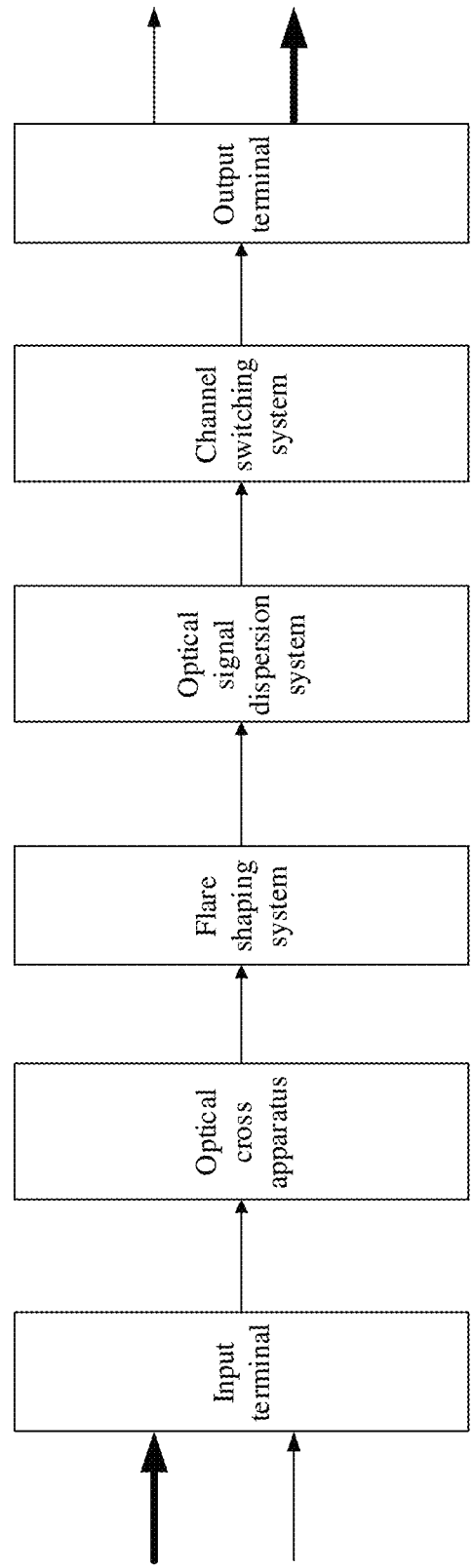
FIG. 3 is an application architectural diagram of an optical cross system according to an embodiment of this application.

An optical cross system is a core device in the dense wavelength division multiplexing all-optical network, and can avoid an electronic bottleneck caused by optical-to-electrical and electrical-to optical conversion on each node in a high-speed electrical transmission network, thereby implementing highly-reliable, large-capacity, and highly-flexible transmission. An optical cross system (also referred to as an optical cross device) implements switching between different optical ports by using a built-in optical switching engine. A specific application scenario of the optical cross system is shown in FIG. 3. Optical signals are output to the optical cross apparatus by using an input terminal; then, the optical cross apparatus changes the single-row input optical signals to multidimensional output beams, and transmits the beams to a flare shaping system; the flare shaping system shapes the beams; after dispersion compensation is performed on the optical signals by using an optical signal dispersion system, channel switching is then performed, and finally the optical signals are output by using an output terminal, and connected to an optical fiber of the output terminal.

Figure 4:
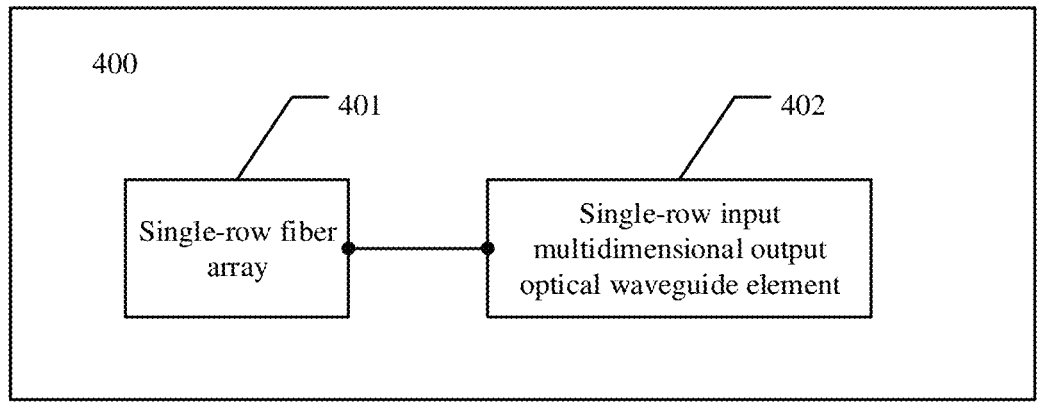
FIG. 4 is a schematic diagram of an optical cross apparatus according to an embodiment of this application.

As shown in FIG. 4, an embodiment of this application provides an optical cross apparatus 400, including a single-row fiber array 401 and a single-row input multidimensional output optical waveguide element 402, where the single-row fiber array 401 is coupled to the single-row input multidimensional output optical waveguide element 402, and an arbitrarily curved spatial three-dimensional waveguide is generated inside the single-row input multidimensional output optical waveguide element 402; and a coupling surface of the single-row fiber array 401 is the same as that of the single-row input multidimensional output optical waveguide element 402.

In this embodiment, on the coupling surface of the single-row fiber array 401 and the coupling surface of the single-row input multidimensional output optical waveguide element 402, a quantity of light outlets included in the single-row fiber array 401 is the same as a quantity of light inlets included in the single-row input multidimensional output optical waveguide element 402, and after coupling, positions are also in one-to-one correspondence, to smoothly transmit optical signals.

Figure 5:
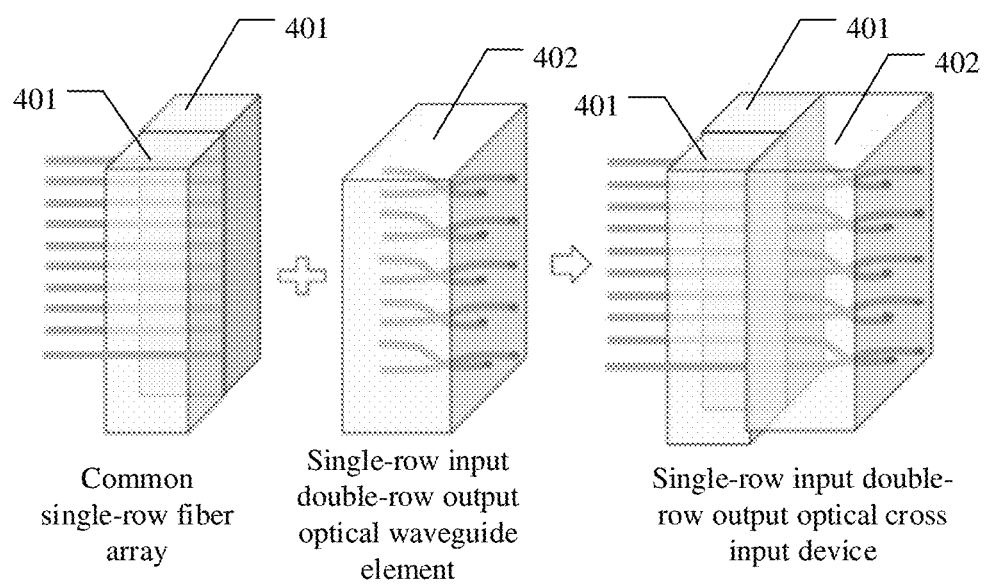
FIG. 5 is another schematic diagram of an optical cross apparatus according to an embodiment of this application.

As shown in FIG. 5, assuming that the single-row fiber array 401 includes five light outlets, and the single-row input multidimensional output optical waveguide element 402 includes 10 light inlets, which form a combination of five rows and two columns at positions of the light outlets, two single-row fiber arrays 401 are required when the optical cross apparatus 400 is assembled, so that a quantity of light outlets of the single-row fiber arrays 401 is the same as that of the light inlets of the single-row input multidimensional output optical waveguide element 402, and positions are in one-to-one correspondence.

Figure 6:
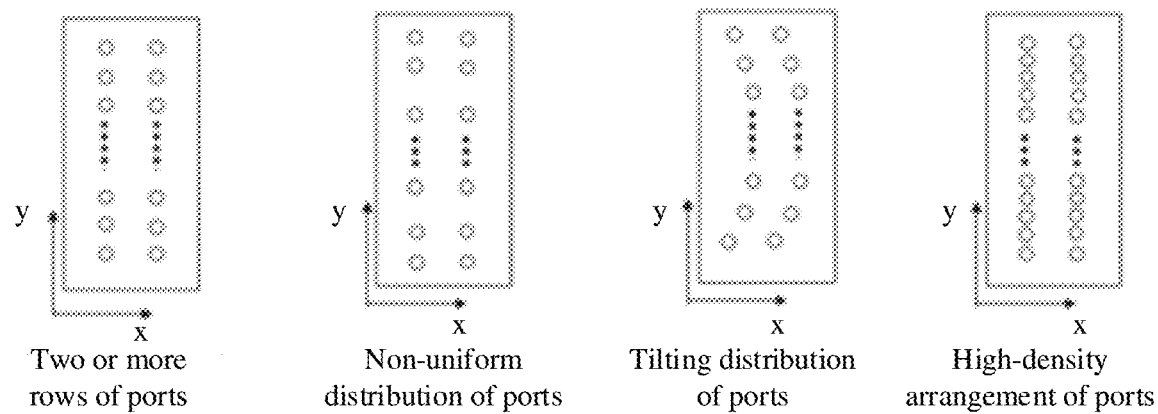
FIG. 6 is a schematic diagram of a combination of light outlets of an optical waveguide element according to an embodiment of this application.
Figure 7:
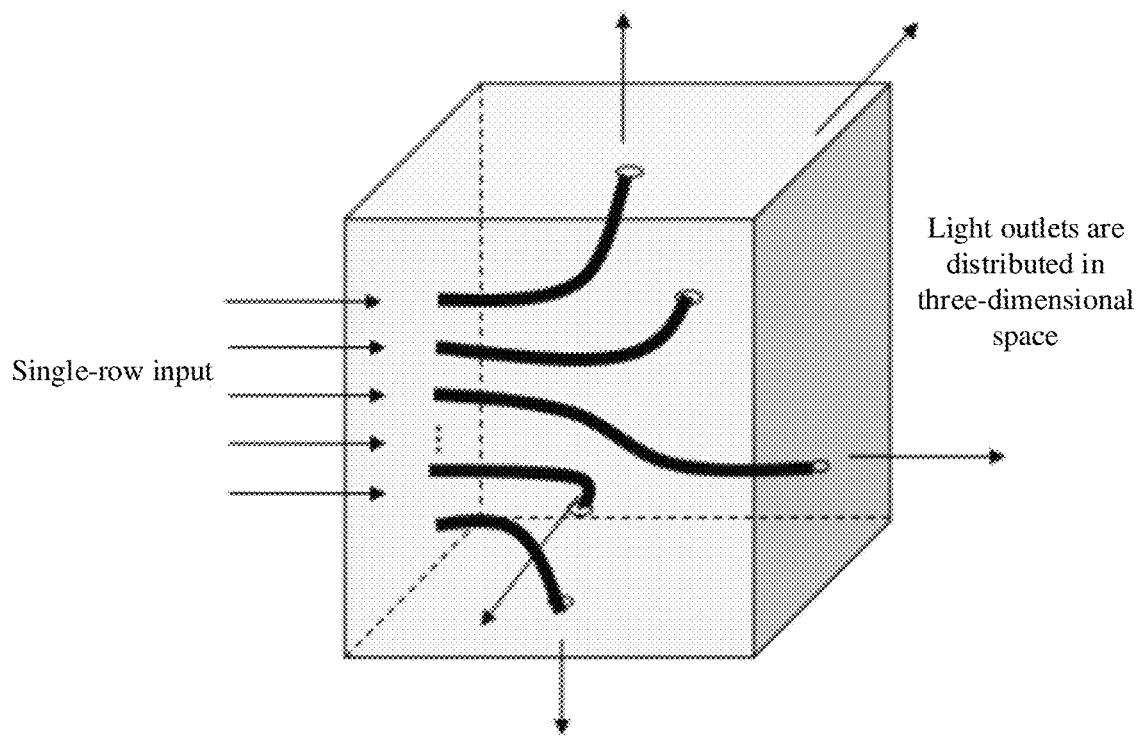
FIG. 7 is another schematic diagram of a combination of light outlets of an optical waveguide element according to an embodiment of this application.

Because the spatial three-dimensional waveguide that can be arbitrarily curved exist inside the single-row input multidimensional output optical waveguide element 402, any combination can be generated for light outlets of the single-row input multidimensional output optical waveguide element 402. As shown in FIG. 6, a combination of the light outlets of the single-row input multidimensional output optical waveguide element 402 includes but is not limited to two or more rows of ports, non-uniform distribution of ports, tilting distribution of ports, or high-density arrangement of ports. A specific combination manner is not limited herein, provided that a specific requirement is satisfied. It may be understood that, the single-row input multidimensional output optical waveguide element 402 can perform more than single-row input double-row output (that is, generate two-dimensional light outlets). Because the single-row input multidimensional output optical waveguide element 402 is a cube, light output can be performed on all surfaces other than a surface in which single-row light inlets are located, to generate light outlets. As shown in FIG. 7, the optical signals are input from single-row light inlets of the single-row input multidimensional output optical waveguide element 402, then pass through paths of the spatial three-dimensional waveguide inside the single-row input multidimensional output optical waveguide element 402, and are output from light outlets distributed in three-dimensions space.

Figure 8:
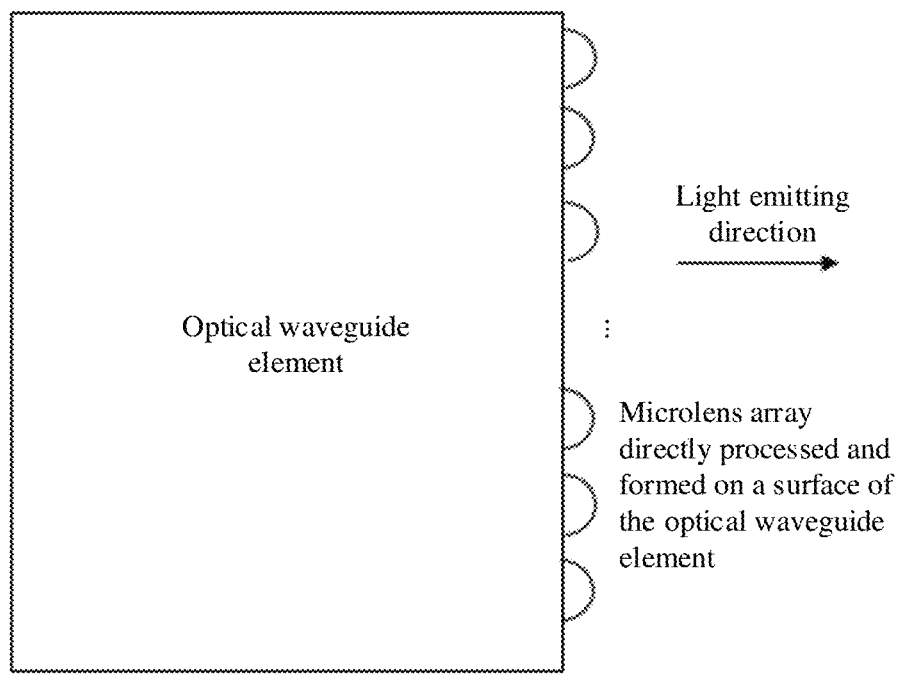
FIG. 8 is a schematic diagram of a microlens on a surface of a light outlet of an optical waveguide element according to an embodiment of this application.

Optionally, a surface of each light outlet of the single-row input multidimensional output optical waveguide element 402 is processed in a femtosecond laser processing manner to generate a microlens, and the microlens is configured to perform beam shaping on beams output from the light outlet. In this embodiment, the surface of the light outlet of the optical waveguide element is processed through one-step forming in the femtosecond laser processing manner, to generate the microlens, so that no gap is left between the microlens and the light outlet of the optical waveguide element, and no coupling loss is introduced anymore. Specifically, as shown in FIG. 8, there are a plurality of light outlets in a light emitting direction of the single-row input multidimensional output optical waveguide element 402, and each light outlet has a microlens that is directly processed and formed on a surface of the single-row input multidimensional output optical waveguide element 402, to form a microlens array.

Figure 9:
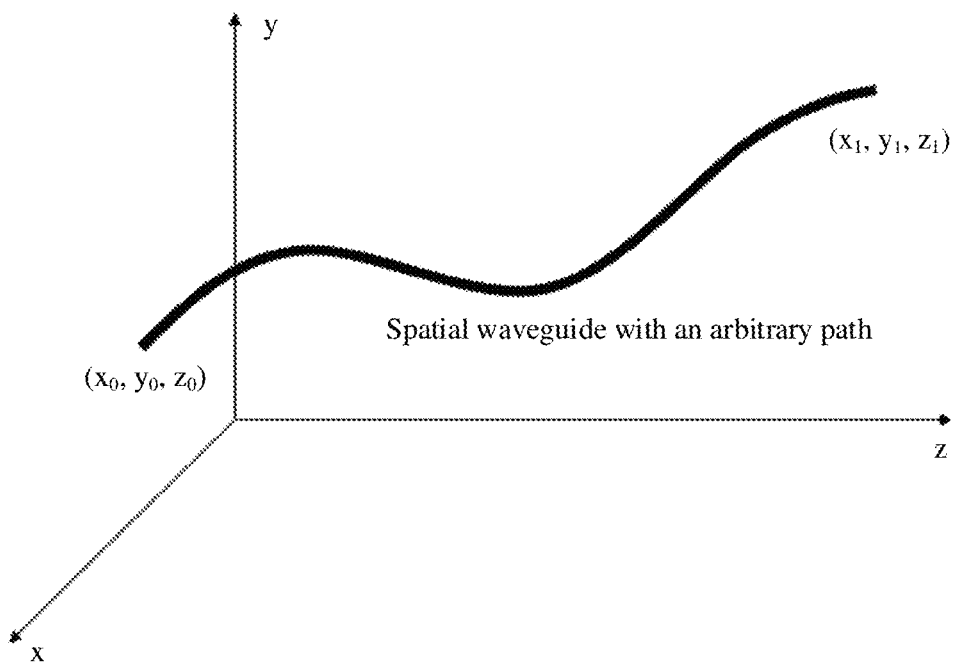
FIG. 9 is a schematic diagram of processing of a waveguide path of an optical waveguide element according to an embodiment of this application.

Optionally, the spatial three-dimensional waveguide inside the single-row input multidimensional output optical waveguide element 402 is generated in a femtosecond laser processing manner. In the femtosecond laser technology, an extremely high peak power (pulse energy/pulse width) can be obtained by using relatively low pulse energy because a pulse width of laser is very short. When a material to be processed is further focused by using an objective lens, or the like, because energy density near a focal point is very high, various strong nonlinear effects can be caused. Femtosecond laser can perform three-dimensional processing and modification on inside of a transparent material such as an optical fiber. In this embodiment, when the spatial three-dimensional waveguide inside the optical waveguide element uses the femtosecond laser processing manner, processing of the optical waveguide element can be facilitated, so that a processing method is easier, and processing costs are reduced. In addition, after femtosecond laser processing is performed, a distance between light outlets after processing can reach a micron level, to implement high-density light emitting, and provide solutions for a high-density and multi-port optical cross system. In addition, a path position of the spatial waveguide in the optical waveguide element can achieve precision of a submicron level, to greatly improve debugging efficiency of the optical cross apparatus. When the single-row input multidimensional output optical waveguide element 402 in this application is processed in the femtosecond laser processing manner, a processing path of each path in the single-row input multidimensional output optical waveguide element 402 needs to be set first, and then the single-row input multidimensional output optical waveguide element 402 is processed by using the processing path. In an example, as shown in FIG. 9, in a three-dimensional coordinate system, a waveguide path from $(x_0, y_0, z_0)$ to $(x_1, y_1, z_1)$ is designed for the single-row input multidimensional output optical waveguide element 402.

Based on the foregoing optical cross apparatus, a transmission path of optical signals in the optical cross apparatus is as follows: Optical signals enter from single-row light inlets of the single-row fiber array, and are output from single-row light outlets of the single-row fiber array to single-row input ports of the single-row input multidimensional output optical waveguide element; and the optical signals are transmitted from optical paths of the spatial three-dimensional waveguide inside the single-row input multidimensional output optical waveguide element to light outlets of the single-row input multidimensional output optical waveguide.

A processing method of the optical cross apparatus is as follows:

Each path of the spatial three-dimensional waveguide in the single-row input multidimensional output optical waveguide element is designed first, and then a processing path of the path of the spatial three-dimensional waveguide is input to a femtosecond laser processing system; and the femtosecond laser processing system processes the optical waveguide element that is not processed.

Figure 10:
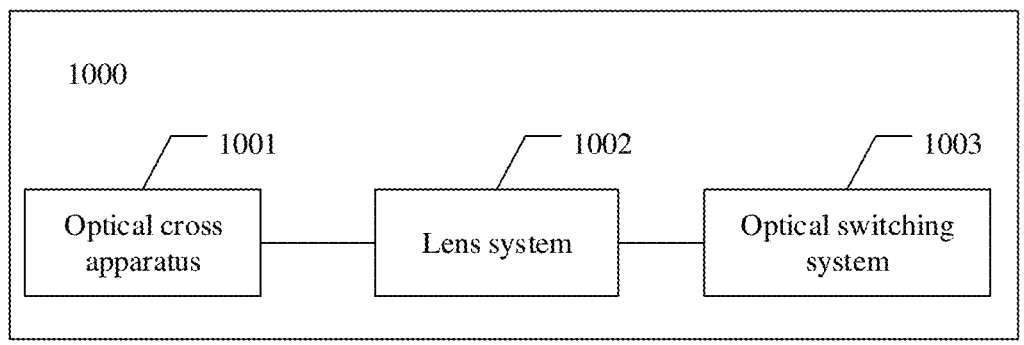
FIG. 10 is a schematic diagram of an embodiment of an optical cross device according to an embodiment of this application.

This application further provides an optical cross device. For details, refer to FIG. 10. The optical cross device 1000 includes an optical cross apparatus 1001 described in any one of FIG. 4 to FIG. 9, a lens system 1002, and an optical switching system 1003. The optical cross apparatus 1001 includes a single-row fiber array and a single-row input multidimensional output optical waveguide element. Light inlets of the single-row fiber array are configured to receive optical signals, and light outlets of the single-row fiber array are coupled to and in one-to-one correspondence with light inlets of the single-row input multidimensional output optical waveguide element, so that the optical signals are transmitted from optical paths of a spatial three-dimensional waveguide inside the single-row input multidimensional output optical waveguide element to light outlets of the single-row input multidimensional output optical waveguide. The lens system includes a lens combination and a grating, and is configured to shape an optical path output by the optical cross apparatus. The optical switching system is configured to switch an output port of the optical path. The optical switching system may be a liquid crystal on silicon (LCOS) programmable element or a micro-electro-mechanical system (MEMS) mirror array.

In this embodiment, the optical cross device may be an optical cross-connect (OXC) switch or a wavelength selective switch (WSS).

It may be clearly understood by persons skilled in the art that, for purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An optical cross apparatus, comprising:
    a single-row fiber array; and
    a single-row input multidimensional output optical waveguide element, the single-row fiber array being coupled to the single-row input multidimensional output optical waveguide element, an arbitrarily curved spatial three-dimensional waveguide being disposed inside the single-row input multidimensional output optical waveguide element;
    the single-row fiber array and the single-row input multidimensional output optical waveguide element sharing a common coupling surface and being coupled together along the common coupling surface, a surface of each light outlet of the single-row input multidimensional output optical waveguide element being formed with a microlens such that there is no gap between the light outlet of the single-row input multidimensional output optical waveguide element and the microlens, the microlens being configured to perform beam shaping.

2. The apparatus according to claim 1, wherein at least one of the spatial three-dimensional waveguide inside the single-row input multidimensional output optical waveguide element or the microlens is formed by a femtosecond laser process.

3. The apparatus according to claim 2, wherein a combination form of light outlets of the single-row input multidimensional output optical waveguide element comprises at least one of two or more rows, non-uniform distribution, tilting distribution, or high-density arrangement.

4. The apparatus according to claim 1, wherein a combination form of light outlets of the single-row input multidimensional output optical waveguide element comprises at least one of two or more rows, non-uniform distribution, tilting distribution, or high-density arrangement.

5. The apparatus of claim 1, wherein the optical cross device is one of an optical cross-connect (OXC) switch or a wavelength selective switch (WSS).

6. An optical path tracing method, comprising:
    inputting optical signals from single-row light inlets of a single-row fiber array of an optical cross apparatus comprising the single-row fiber array and a single-row input multidimensional output optical waveguide element, the single-row fiber array sharing a common coupling surface and being coupled to the single-row input multidimensional output optical waveguide element along the common coupling surface, an arbitrarily curved spatial three-dimensional waveguide being disposed inside the single-row input multidimensional output optical waveguide element;
    outputting the optical signals from single-row light outlets of the single-row fiber array through a microlens formed at the outlet to single-row input ports of the single-row input multidimensional output optical waveguide element, the microlens being configured to perform beam shaping and being devoid of a gap between the light outlet of the single-row input multidimensional output optical waveguide element and the microlens; and
    transmitting the optical signals from optical paths of the spatial three-dimensional waveguide inside the single-row input multidimensional output optical waveguide element to light outlets of the single-row input multidimensional output optical waveguide element.

7. The method according to claim 6, further comprising shaping an optical path output by the optical cross apparatus using a lens system.

8. The method according to claim 6, wherein the optical cross device is one of an optical cross-connect (OXC) switch or a wavelength selective switch (WSS).

9. An optical cross device, comprising:
    an optical cross apparatus;
    a lens system comprising a plurality of microlenses, each microlens being formed in a femtosecond laser processing manner; and
    an optical switching system;
    the optical cross apparatus comprising:
        a single-row fiber array; and
        a single-row input multidimensional output optical waveguide element, the single-row fiber array being coupled to the single-row input multidimensional output optical waveguide element, an arbitrarily curved spatial three-dimensional waveguide being disposed inside the single-row input multidimensional output optical waveguide element and being configured to receive an optical signal and output the optical signal to the lens system, each microlens of the lens system being formed at the light outlet of the single-row input multidimensional output optical waveguide element such that there is no gap between the microlens and the outlet, the microlens being configured to perform beam shaping of an optical path along which the optical signal travels, the optical switching system being configured to switch an output port of the optical signal;

the single-row fiber array and the single-row input multidimensional output optical waveguide element sharing a common coupling surface and being coupled along the common coupling surface.

10. The optical cross device according to claim 9, wherein the spatial three-dimensional waveguide inside the single-row input multidimensional output optical waveguide element is formed by a femtosecond laser process.

11. The optical cross device according to claim 10, wherein a combination form of light outlets of the single-row input multidimensional output optical waveguide element comprises at least one of two or more rows, non-uniform distribution, tilting distribution, or a high-density arrangement.

12. The optical cross device according to claim 9, wherein a combination form of light outlets of the single-row input multidimensional output optical waveguide element comprises at least one of two or more rows, non-uniform distribution, tilting distribution, or a high-density arrangement.

13. The optical cross device according to claim 9, wherein the lens system comprises a lens combination and a grating, and is configured to shape an optical path output by the optical cross apparatus.

14. The optical cross device according to claim 9, wherein the optical cross device is one of an optical cross-connect (OXC) switch or a wavelength selective switch (WSS).

* * * * *